United States Patent
Yap et al.

(10) Patent No.: US 9,332,121 B2
(45) Date of Patent: May 3, 2016

(54) METHOD FOR IMPLEMENTING USER-SPECIFIC CALLING PREFERENCES

(75) Inventors: Shen-Yuan Michael Yap, Woodland Hills, CA (US); Michael Colbert, Debary, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 953 days.

(21) Appl. No.: 12/389,829

(22) Filed: Feb. 20, 2009

(65) Prior Publication Data

US 2010/0228780 A1    Sep. 9, 2010

(51) Int. Cl.
- G06F 17/30 (2006.01)
- H04M 3/46 (2006.01)
- H04M 1/654 (2006.01)
- H04M 3/02 (2006.01)
- H04M 3/42 (2006.01)

(52) U.S. Cl.
CPC ............... *H04M 3/46* (2013.01); *H04M 1/654* (2013.01); *H04M 3/02* (2013.01); *H04M 3/42017* (2013.01)

(58) Field of Classification Search
CPC ....... G06F 3/0635; H04M 3/46; H04M 1/654; H04M 3/42017; H04M 3/02
USPC ........................................................ 707/784
See application file for complete search history.

(56) References Cited

U.S. PATENT DOCUMENTS

| | | | |
|---|---|---|---|
| 5,905,789 A | 5/1999 | Will | |
| 6,038,291 A | 3/2000 | Cannon et al. | |
| 6,198,812 B1 | 3/2001 | Weber | |
| 6,301,350 B1 * | 10/2001 | Henningson et al. | 379/220.01 |
| 6,359,970 B1 | 3/2002 | Burgess | |
| 6,580,784 B2 | 6/2003 | Rodriguez et al. | |
| 6,735,292 B1 | 5/2004 | Johnson | |
| 6,978,003 B1 | 12/2005 | Sylvain | |
| 6,978,004 B1 | 12/2005 | Levine | |
| 7,164,759 B2 | 1/2007 | Lebowitz et al. | |
| 7,194,080 B2 | 3/2007 | Worsham et al. | |
| 7,242,754 B2 | 7/2007 | Adams et al. | |
| 7,409,208 B1 * | 8/2008 | Clare et al. | 455/419 |
| 7,443,963 B2 | 10/2008 | Scherer | |
| 8,315,609 B2 * | 11/2012 | Gisby | 455/414.1 |
| 2002/0191595 A1 | 12/2002 | Mar et al. | |
| 2005/0069097 A1 | 3/2005 | Hanson et al. | |

(Continued)

FOREIGN PATENT DOCUMENTS

WO    03/058895    7/2003

OTHER PUBLICATIONS

"VoIP Simultaneous Ringing", http://www.voip-resource.com/features/simultaneous-ringing.html.

(Continued)

*Primary Examiner* — Leslie Wong
(74) *Attorney, Agent, or Firm* — Fish & Richardson P.C.

(57) ABSTRACT

A method and system of establishing calling preferences for a user are provided. The method includes: defining a user profile containing an association between the user and two or more communication devices, each device having an associated device type; assigning the user to at least one group; obtaining group preferences associated with one or more of the user's groups; determining user preferences for the user based on the group preferences and the device types of the communication devices associated with the user; and storing the user specific preferences in a user profile associated with the user.

17 Claims, 8 Drawing Sheets

(56) References Cited

U.S. PATENT DOCUMENTS

| | | |
|---|---|---|
| 2005/0201362 A1* | 9/2005 | Klein et al. .................... 370/352 |
| 2006/0010206 A1* | 1/2006 | Apacible et al. ............... 709/205 |
| 2006/0013254 A1* | 1/2006 | Shmueli et al. ............... 370/466 |
| 2006/0077957 A1 | 4/2006 | Reddy et al. |
| 2006/0093121 A1 | 5/2006 | Sylvain |
| 2006/0153353 A1 | 7/2006 | O'Neil |
| 2006/0291640 A1* | 12/2006 | Nagesh et al. ............ 379/211.02 |
| 2007/0061328 A1* | 3/2007 | Ramer et al. .................... 707/10 |
| 2007/0127656 A1 | 6/2007 | Citron et al. |
| 2007/0217437 A1* | 9/2007 | Forte ............................. 370/401 |
| 2007/0253546 A1 | 11/2007 | Schwab et al. |
| 2008/0146206 A1* | 6/2008 | Pichardo et al. ............... 455/415 |
| 2009/0097631 A1* | 4/2009 | Gisby et al. ............... 379/211.02 |

OTHER PUBLICATIONS

Office Action mailed Apr. 17, 2012, in corresponding Canadian patent application No. 2,693,610.

Office Action mailed Oct. 29, 2012, in corresponding Canadian patent application No. 2,693,610.

Office Action mailed Jun. 11, 2014; in corresponding Canadian patent application No. 2,693,610.

Office Action mailed Oct. 25, 2013, in corresponding Canadian patent application No. 2,693,610.

Examination report mailed Jan. 7, 2014, in corresponding European patent application No. 09153366.1.

\* cited by examiner

METHOD FOR IMPLEMENTING USER-SPECIFIC CALLING PREFERENCES

FIELD

The present application relates to call management systems and, more particularly, to methods and systems for establishing calling preferences for individual users of such systems.

BACKGROUND

Users of communication devices often have multiple communication devices. For example, such users may be associated with wireless devices such as a Smartphone, analog or digital telephones such as a network phone or a home phone, soft phones operating on computers, such as Skype™, etc.

A caller trying to reach a desired recipient may not reach that recipient on the communication device associated with the dialed number used by the caller. For example, the desired recipient may be away from that communication device at the time the call is received.

Thus, there remains a need for improved systems for managing calls.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In one aspect, the present application provides a method of establishing calling preferences for a user. The method comprises: a) defining a user profile containing an association between the user and two or more communication devices, each device having an associated device type; b) assigning the user to at least one group; c) obtaining group preferences associated with one or more of the user's groups; d) determining user preferences for the user based on the group preferences and the device types of the communication devices associated with the user; and e) storing the user specific preferences in a user profile associated with the user.

In another aspect, the present application provides a system for establishing calling preferences for a user. The system includes at least one memory storing group preferences. The memory is also for storing a user profile for the user. The user profile associates the user with two or more communication devices and at least one group. Each device has an associated device type. The system further includes a user profile configuration module connected to the memory, the configuration module is configured to: a) obtain the group preferences associated with one or more of the user's groups from the memory; b) determine user preferences for the user based on the group calling preferences and the device types of the devices; and c) store the user preferences in the user profile.

In yet another aspect, the present application provides a method of ringing one or more communication devices associated with a user, the method comprising: a) receiving a call; b) determining that the call is associated with the user; c) obtaining a user profile associated with the user, the user profile containing an association between the user and two or more communication devices and an association between the user and at least one group, the user profile including user preferences, the user preferences being based on group preferences associated with the user's group; and d) ringing the user's devices according to the user preferences.

In yet another aspect, the present application provides a method of ringing one or more communication devices associated with a user. The user is associated with a group. The method comprises: a) receiving a call; b) determining that the call is associated with the user; and c) ringing the user's devices in an order associated with the user's group.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

The present application relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Figure 1:
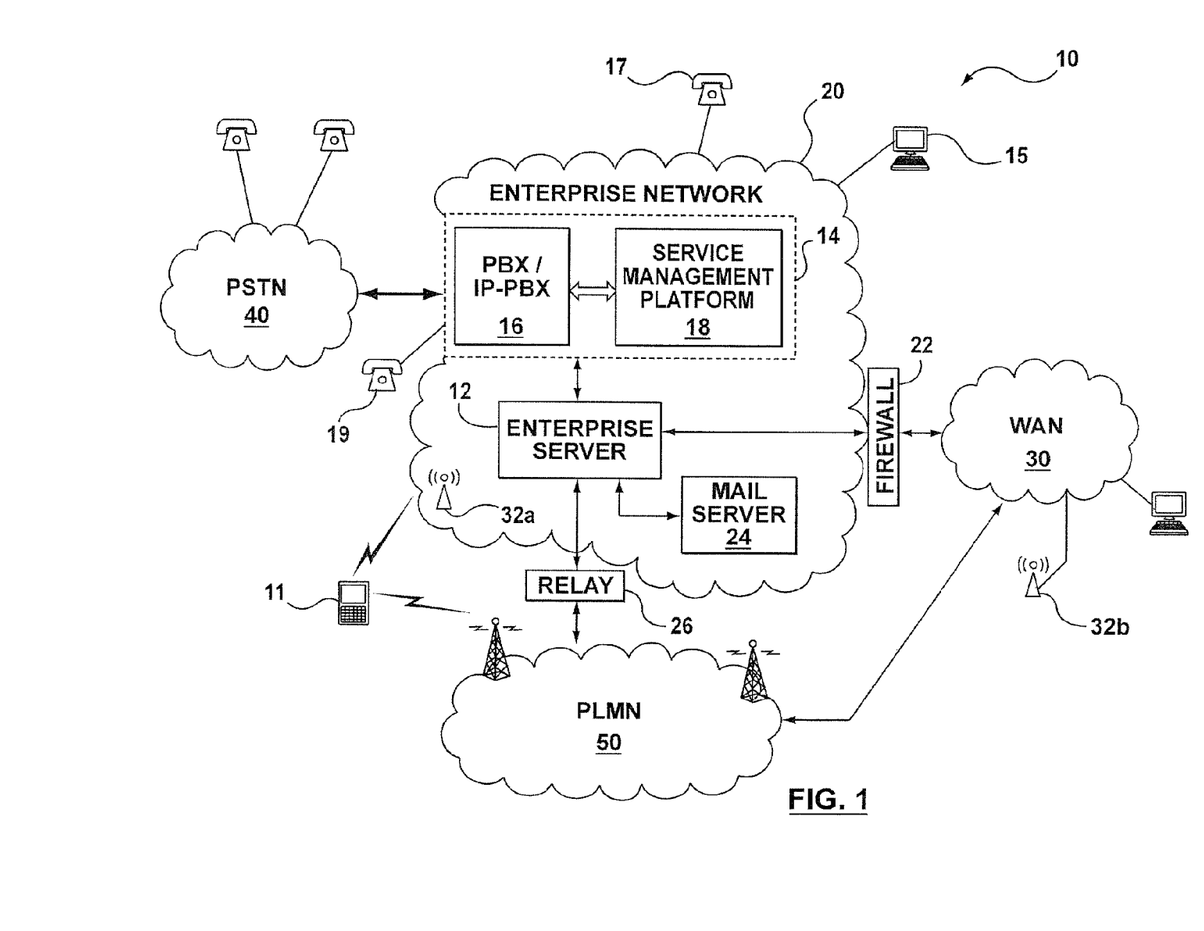
FIG. 1 shows, in block diagram form, an example system for managing enterprise-related mobile calls, including an enterprise communications platform.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch exchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. As will be described in greater details below, in some embodiments, the communication platform 14 may implement advanced ringing schemes which provide for simultaneous and/or sequential ringing of multiple communication devices. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 19. Example features may include direct extension dialing, enterprise voice mail, conferencing, call transfer, call park, etc.

Figure 2:
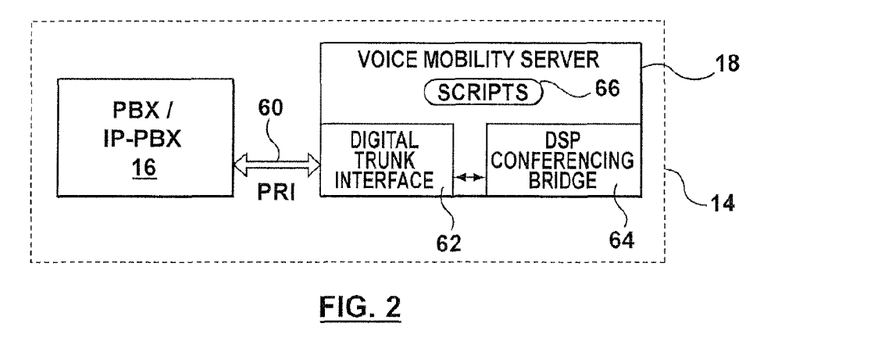
FIG. 2 shows, in block diagram form, further details of an embodiment of the enterprise communications platform.
Figure 3:
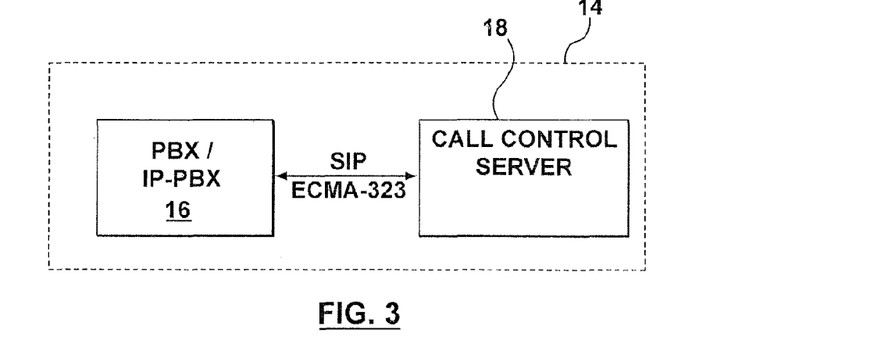
FIG. 3 shows another embodiment of the enterprise communications platform.
Figure 4:
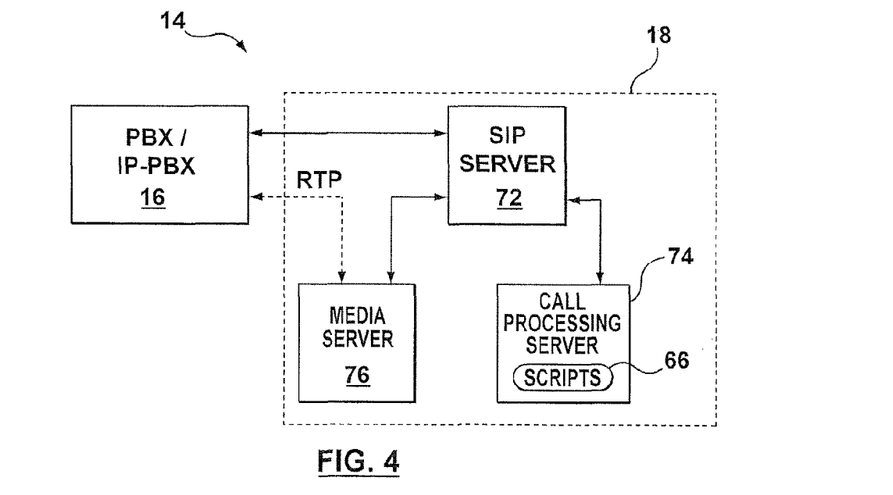
FIG. 4 shows yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5:
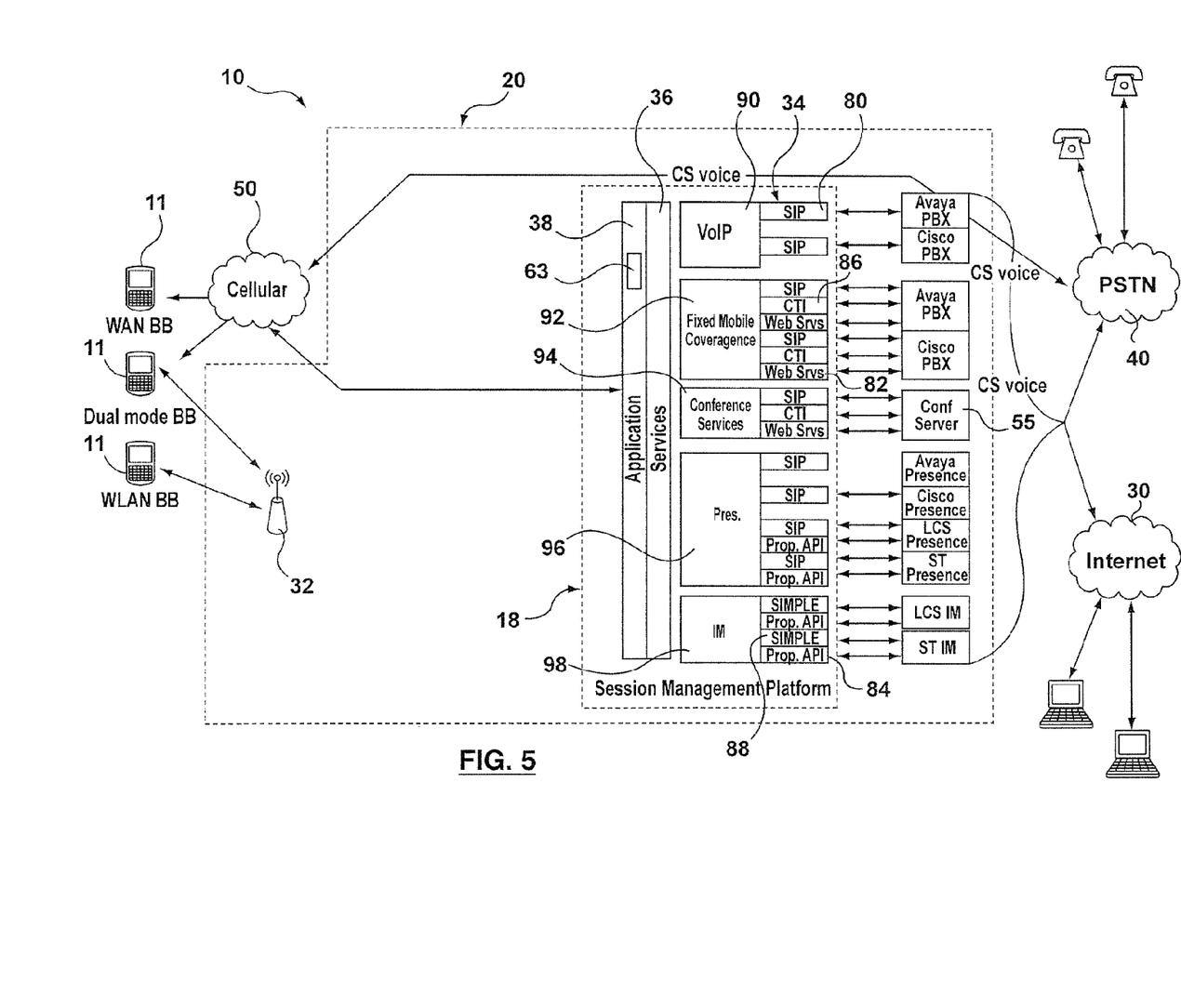
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. The conference call server 55 is configured for directing media and data streams to and from one or more communication devices (i.e., mobile devices 11, telephones 17, and computers 15).

As discussed above, the specific functions of the SMP 18 will vary based on the particular system within which it operates. Referring still to FIG. 5, in some embodiments, the SMP 18 is adapted to establish and implement calling preferences for users of the enterprise network 20. The users can include any users which have at least one communication device which may receive calls through the enterprise network 20. For example, the users may be users of the analog telephones 19 connected to the PBX 16, users of the digital telephone sets 17, users of soft phones operating on computers 15 connected to the enterprise network, or users of the mobile devices 11.

Users may be associated with multiple communication devices. For example, a user may be associated with devices of different device types, such as digital telephone sets 17, analog telephone sets 19, soft phones operating on computers 15, or mobile devices 11. Some users may be associated with multiple communication devices of the same type. For example, a user may be associated with an analog phone 19 at a first location, such as the user's desk, and another analog phone 19 at a second location, such as a laboratory in which the user often works. For the purposes of this disclosure, "device types" may refer to either the communication technology of the device (i.e. analog telephone, digital telephone, mobile device, etc. . . . ) or the location of the device (i.e. home, office, laboratory, meeting room, reception, etc. . . . ). "Device type" may also refer to any combination of these identifiers. For example, the device type for a first device may be "home phone" and the device type of the second device may be "cellular phone."

At least one of the devices associated with the user is a device which is controlled by the enterprise network 20. Alternatively, multiple devices may be controlled by the enterprise network 20. A controlled device is a device for which the enterprise network 20 is engaged when the user receives a call directed to that device. However, in some embodiments, the devices which are associated with the user and managed by the system 10 may include devices which are outside of the enterprise network 20, such as devices connected to the PSTN 40. Devices such as these, which are outside of the enterprise network 20 may be devices to which a received call is directed in a call forwarding or advanced ringing scheme.

Figure 6A:
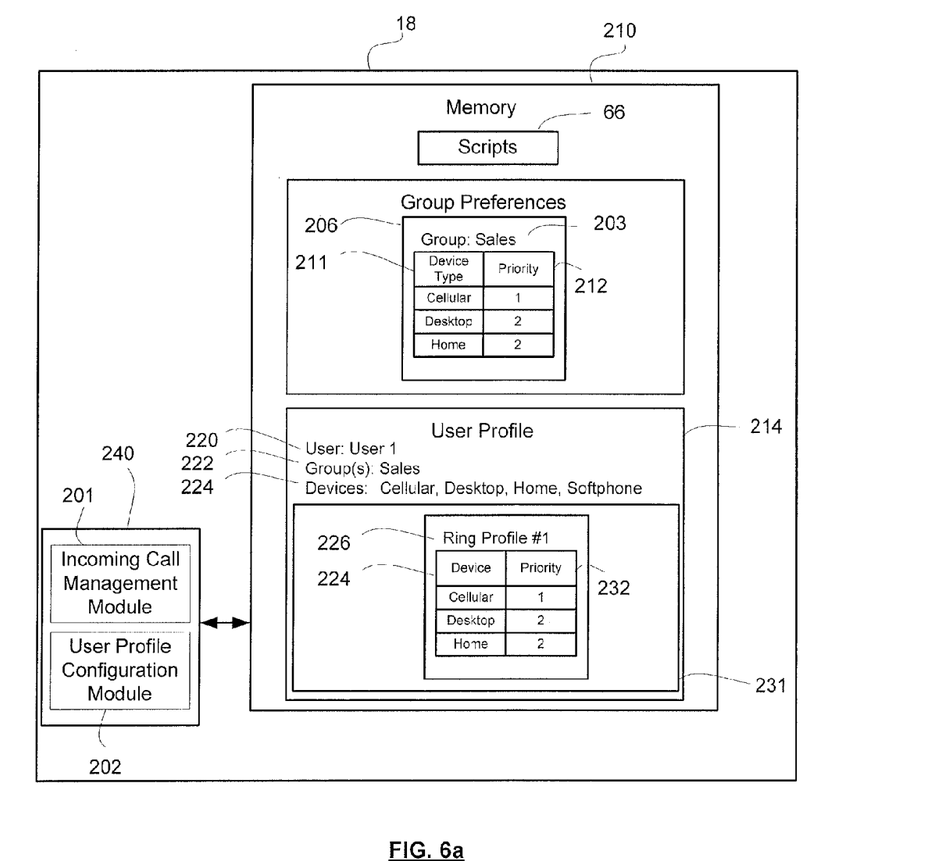
FIG. 6a shows, in block diagram form, a basic example of a service management platform for use in an embodiment of the system of FIG. 1.

Reference is now made to FIG. 6a, which shows an example of a service management platform 18. While the specific hardware required to implement the SMP 18 will vary based on the particular network within which it operates, typically, the SMP 18 will include one or more processor 240 and at least one memory 210. The processor 240 operates under stored program control and executes computer code, such as scripts 66 stored in memory 210 such as persistent memory, for example, in flash memory. The scripts 66 may include scripts for configuring user preferences 231 for users 220 of the system. While the memory 210 has been illustrated as a single component, it will be appreciated by a person skilled in the art that the memory 210 will typically be comprised of multiple memory components. For example, the memory 210 may include any one, or a combination of: random access memory, flash memory, a hard disk drive, an optical storage medium, etc.

Those skilled in the art will appreciate that the scripts 66 or parts thereof may be temporarily loaded into volatile memory such as RAM. The RAM is used for storing runtime data variables and other types of data or information, as will be apparent to those skilled in the art. Although specific functions may be described for various types of memory, this is merely an example, and those skilled in the art will appreciate that a different assignment of functions to types of memory could also be used.

The SMP 18 may include an incoming call management module 201 for routing calls to one or more devices. The SMP 18 may also include a user profile configuration module 202 which is configured to determine user preferences 231 for the users of the enterprise network 20 of FIG. 1. Since some users 220 may be associated with multiple devices, in some embodiments, the user preferences 231 may define a ringing scheme for the user. Such ringing schemes may be referred to as ring profiles 226. The ringing scheme may establish a relative ringing priority for the plurality of devices associated with the user 220. When the user 220 is called through the enterprise network 20 (thereby engaging the enterprise network 20), the ringing scheme may be implemented, and devices rung according to their priority.

The user profile configuration module 202 may be implemented on the processor 240, which may be configured to perform the configuration functions described herein.

In some embodiments, a user 220 may be associated with one or more groups 222, in a user profile 214 stored in memory 210. For example, in the embodiment illustrated in FIG. 6a, the user 220 is associated with a single group 222 (i.e. sales). The groups 222 indicate at least one characteristic or common feature of users associated with that group. In some embodiments, the groups 222 may indicate the user's occupation. For example, in the embodiment illustrated in FIG. 6, a sales group 203 may be associated with salespeople. In some embodiments, the groups 222 may indicate a team associated with group members. For example, the teams may include a safety team, a hazardous materials team, etc. In other embodiments, the groups 222 may indicate the amount of travel associated with group member's jobs. For example, such groups 222 could include groups defining the approximate amount of time that a user spends away from the office, such as, for example, a group 222 for members who travel very little; another group for members who travel a lot; and another group for members who do not travel. In other embodiments, the groups 222 may characterize how essential it is that the group member be reachable on at least one communication device. For example, users may be grouped as either "essential" or "non-essential." Other groups may classify group members as either "professionals" or "non-professionals." It will be understood that the groups listed above are only illustrative and that other groups are also possible.

In some embodiments, when a user 220 is added to the system by a system administrator, the system administrator may assign the user 220 to one or more groups 222 in their user profile 214. In some embodiments, a default group may be automatically generated for a user by the SMP 18. For example, in some embodiments, all users may initially be assigned a "default" group. The default group may define common preferences for an average user. In other embodiments, the SMP 18 may assign the user a specific group based on other information about the user 220 in the user's profile 214. For example, the SMP 18 may be configured to parse other information in the user's profile which describes one or more characteristic of the user 220 to determine which groups 222 the user is associated with. By way of example, the system may examine a field in the user's profile which lists the user's title. Similarly, a field which lists a department to which the user belongs may be used by the SMP 18 to determine an appropriate default group for the user.

The user profile 214 may also include a listing 224 of devices which are associated with the user 220. For example, in the example shown in FIG. 6a, the user 220 is associated with cellular, desktop, home, and softphones in the user's profile 214.

The user profile 214 may also include other information about the user 220 such as, for example, the name of the user 220, an identification number associated with the user 220, the user's department, the user's job title, etc.

As will be explained in greater detail below, in some embodiments the user profile configuration module 202 may be configured to establish calling preferences 231 for a user 220 based on the user's associated group 222 or groups 222. Based on characteristics of the user, which are defined by the user's associated groups 222, user preferences 231, such as a ring profile 226 may be established for that user.

Since the user preferences 231 are related to the user's group(s) 222, which are related to characteristics of the user 220, appropriate user preferences 231 may be established for users 220 based on preferences 206 defined for one or more group 203 corresponding to the user's group 22. For example, some users, such as salespeople, may travel more than other users. Accordingly, mobile devices 11 may be given a higher priority 232 for such people than they would otherwise be given. That is, mobile devices 11 may be given a higher priority 232 for user's who tend to travel a greater amount.

Similarly, some users, such as those deemed "essential" may be expected to be reachable at all times. Accordingly, for such users, their home phone may be included in their ring profile 226. Other users may have a job in which it is inappropriate or unnecessary for them to receive calls at home. The home phones for such users may not be included in their ring profile 228, or may be assigned a priority 232, such as zero, which indicates that the number is not to be called.

In some embodiments, group preferences 206 for groups 203 that users 220 may be associated with are stored in the memory 210. The group preferences 206 may be group calling preferences which establish a ring priority 212 for a plurality of device types 211. The group preferences 206 may be established, for example, by a system administrator.

As will be explained in greater detail below, the user profile configuration module 202 may be configured to use the group preferences 206 for a group 203 which corresponds to the user's group 222 in order to establish user specific preferences 231, such as a ring profile 226 and/or rules 234 for ringing the user.

Figure 6B:
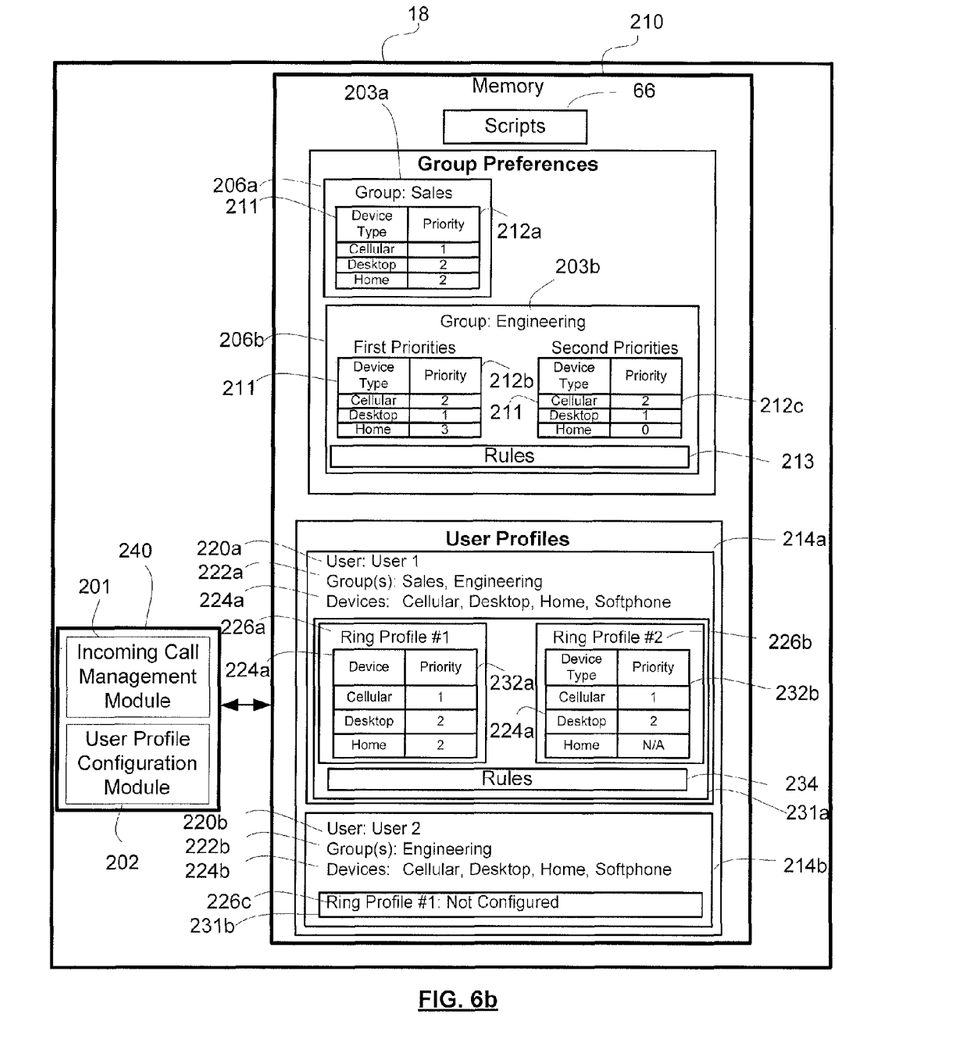
FIG. 6b shows, in block diagram form, an example of a service management platform for use in an embodiment of the system of FIG. 1.

Referring now to FIG. 6b, a block diagram is shown illustrating a further example of the service management platform 18. As will be appreciated by one skilled in the art, the memory 210 will typically contain group preferences 206a, 206b for multiple groups 203a, 203b. By way of example, in FIG. 6b, group preferences 206a, 206b are defined for a first group 203a, which is a "Sales" group, and a second group 203b, which is an "Engineering" group. The group preferences 206a, 206b for each of the groups 203a, 203b may define ringing priorities 212a, 212b for group members. In the example shown, the ring priority level 212a associated with a salesperson's cellular phone is one (1), while the ring priority level 212b associated with an engineer's cellular phone is two (2).

Similarly, the memory 210 will also typically contain user profiles 214a, 214b for more than one user 220a, 220b. In the example shown in FIG. 6b, there is a first user 220a and a second user 220b. It will be appreciated that the SMP 18 may be configured to support any number of users 220 and that the maximum number of users 220 may, in some embodiments, be constrained only by resource limitations.

In some embodiments, users 220 may be associated with multiple ring profiles 226a, 226b. For example, in the example of FIG. 6b, a first user 220a is associated with both a first ring profile 226a and a second ring profile 226b. Similarly, groups 203 may be associated with multiple ring profiles 212. For example, in the example of FIG. 6b, the second group 203b is associated with both a first ring profile 212b and a second ring profile 212c. The group 203 may also be associated with group rules 213 and the user 220 may be associated with user rules 234 which define the circumstances under which each of the ring profiles 212b, 212c may be used. Where a user 220 is associated with multiple ring profiles 226a, 226b, the user preferences 231 may include rules 234 defining a process for applying the profiles 226a, 226b in order to resolve or avoid any potential conflicts.

Figure 7:
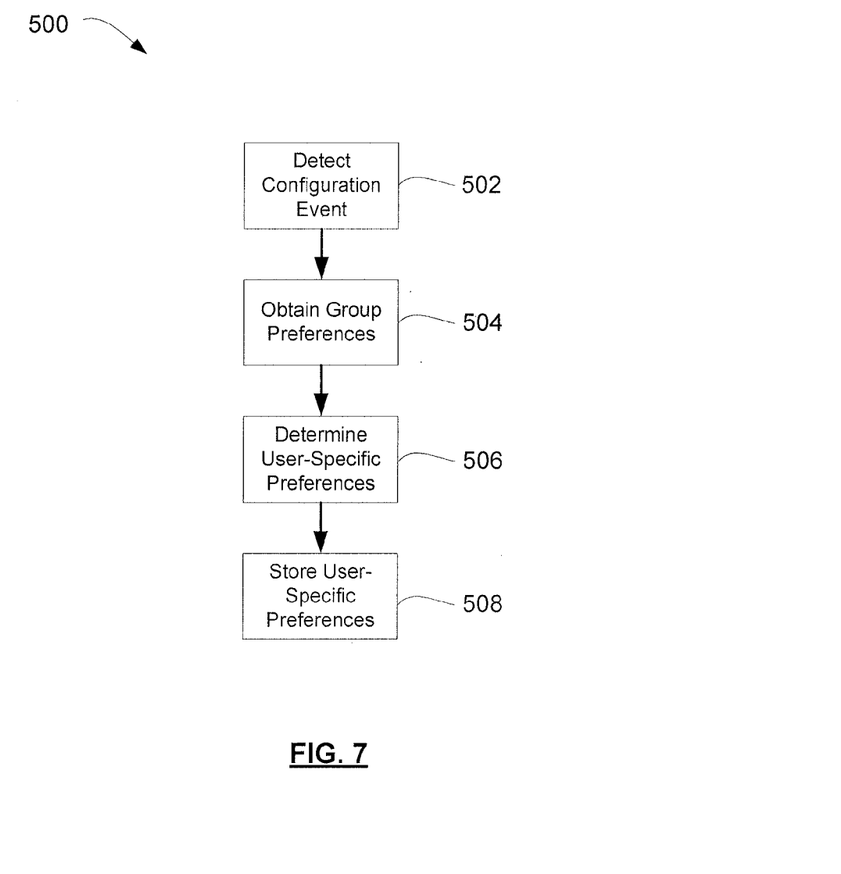
FIG. 7 shows a flowchart illustrating a method of configuring user-preferences in accordance with an embodiment of the present disclosure.

Referring now also to FIG. 7, a flowchart is shown illustrating a method 500 of configuring a user's calling preferences 231 in accordance with an embodiment of the present disclosure. At step 502, the user profile configuration module 202 detects an event which suggests that the profile for a user 220 should be configured. This event may include, for example, detecting the creation of a new user profile 214. In other embodiments, the user profile configuration module 202 may initialize a user's preferences 231 if it detects that a user 220 is associated with one or more groups 222, but the user preferences 231, or ring profile 226 for the user 220 have not yet been set up. For example, referring still to FIG. 6b, a user profile 214b is shown for the second user 220b. In this example, the ring profile 226 has not yet been configured. The SMP 18 may be configured to interpret this as an event which requires user preferences 231 to be configured for that user 220b.

Next, at step 504, the user profile configuration module 202 may obtain the group preferences 206 associated with one or more of the user's associated groups 222 from the memory 210.

Next, at step 506, the user profile configuration module 202 determines user-specific calling preferences 231 from the group preferences 206 associated with one or more of the user's associated groups 222.

Where the user 220 is only associated with one group 222, the user's calling preferences 231, such as the ring profile 226 and/or the user rules 234, may be determined from the group preferences 206 for the group 203 corresponding to the user's group 22.

In some cases, the user's devices 224 may not include a device of each device type 211 listed in the group preferences 206 for the group 203 corresponding to the user's group 222. That is, the group preferences 206 for the group 203 corresponding to the user's group 222 may include a device type 211 which the specific user does not have; such as, for example, a cellular phone. In such cases, the user profile configuration module 202 may determine the user's calling preferences 231 based on the group preferences 206 for the group 203 corresponding to the user's group 222, and the available device types 224 for the user. If the specific user 220 is not associated with a device of a device type 211 included in the group preferences 206 for the group 203 corresponding to the user's group 222, the user profile configuration module 202 may increase the priority 232 assigned to all devices allocated a lesser priority than the non-included device in the group preferences 206. In the example illustrated in FIG. 6b, the group preferences 206b for the second group 203b, which is an engineering group, includes priorities 212b for a desktop phone, which is ranked priority one (1); a cellular phone, which is ranked priority two (2); and a home phone, which is ranked priority three (3). If the specific user 220 was not associated with a cellular phone, then the home phone may be bumped a priority level and assigned priority two (2) instead of priority three (3). Alternatively, in some embodiments, when a user 220 is not associated with a device of a device type 211 included in the group preferences 206 for the group 203 corresponding to the user's group 222, the user profile configuration module 202 may not adjust the priority level. In such embodiments, any gaps in priority levels may be accounted for when calls are routed. That is, the incoming call management module 201 may be configured to skip any such gaps when routing calls. For example, if the preferences 231 for a user 220 include a device 224 which is assigned a priority of one (1), and a device 224 which is assigned a priority of three (3), but no devices 224 assigned a priority of two (2), the incoming call management module 201 may be configured to first ring the priority one (1) device and, immediately thereafter, ring the priority three (3) device.

Similarly, if the specific user 220 has devices of a device type 224 which is not prioritized in the group preferences 206 for the group 203 corresponding to the user's group 222, those devices may be allocated a lesser priority 232 than the devices which are included in the profile. In the example of FIG. 6b, the user profile 214b for the second user 220b is associated with the engineering group 222b and the user 220b has devices 224b which include a cellular phone, a desktop phone, a home phone, and a softphone. The group preferences 206b for the engineering group 203b do not include a priority for softphones. Accordingly, the softphone could be allocated the next available lowest priority. In the example given, the softphone could be allocated priority four (4). In other embodiments, where the user 220 has devices of device types 224 which are not prioritized in the group preferences 206 for group 203 associated with the user's group 222, those devices may be allocated a priority which indicates that they will never be called by the enterprise network 20, such as priority zero (0).

In some embodiments, users 220 may be associated with multiple groups 222. In the example shown in FIG. 6b, the user profile 214a for the first user 220a associates the user 220a with two groups 222a: sales and engineering. The groups 222 themselves may be ranked and the user profile configuration module 202 may be configured to determine the user specific preferences 231 based on the group preferences 206 for the highest ranking group. That is, the groups 222 may be ranked based on their order of importance, and the user specific preferences 231 determined from the group with the greatest importance. The ranking of the groups 222 may be user-specific, or it may be absolute. That is, the groups associated with each user may be ranked in the user profile 214 and the ranking may define the group 222 that corresponds most closely to the characteristics of the specific user 220. For example, where a user 220 is an engineer who is more involved in sales than engineering, the user 220 may be associated both with the sales and engineering groups. However, since the nature of the user's work is more sales-oriented than engineering-oriented, the sales group 203a may be ranked higher than the engineering group 203b for the user 220. This ranking may be specified in the user's profile 214.

In other embodiments, group rankings may be absolute, and may establish relative levels of importance for groups 203 which may be applied for all users 220. For example, the group rankings may specify that one group 222 (i.e. sales) will always take precedence over another group 222 (i.e. engineering).

In other embodiments, the user profile configuration module 202 will determine user specific preferences 231 based on the group preferences 206 for more than one group 222 which the user is associated with. For example, the group preferences 206 may include multi-group preferences which define group preferences to be used where the user 220 is associated with a combination of groups 222. For example, the group preferences 204 may include preferences for a first group 203a, such as engineering, preferences for a second group 203b, such as sales, and multi-group preferences (not shown) for the combined group of sales and engineering. Where a specific user 220 is a member of only the first group 203a (i.e. sales), the group preferences 206a associated with the first group 203a may be used to establish the user-specific preferences 231. Similarly, where the user is a member of both the first group 203a (i.e. sales) and the second group 203b (i.e. engineering), the group preferences associated with the combined sales and engineering group may be used to establish user preferences 231.

While the group preferences 206 have been illustrated using ordered lists defining relative ring priorities 212 associated with various device types 211, it will be appreciated that group preferences 206 may take other forms. For example, the group preferences 206 may be computer executable instructions which establish a process by which user-specific preferences 231, such as ring profiles 226, may be established. In such cases, where a user 220 is associated with multiple groups, an algorithm associated with each group 222 may be applied to the user's preferences 231. For example, the group preferences 206 may each alter default preferences in a predetermined manner established by the group preferences 206. For example, if a user 220 is part of a group associated with a relatively large amount of travel, the user's mobile device 11 may be given a higher priority level than it would otherwise be given. This may be accomplished, for example, by increasing the priority level 232 associated with that user's mobile device 11 by a predetermined amount or by allocated a specific predetermined priority to that device. Similarly, if a user 220 was associated with an "essential" group which indicates that it is important that the user 220 be reachable at all times, the user's home phone could be added to the user's ring profile 226.

Users 220 may have multiple ring profiles 226 in some embodiments. An example of such an embodiment is shown in FIG. 6b where the first user 220a has multiple ring profiles 226a, 226b. In some embodiments, the user preferences 231, may include user specific rules 234 which define conditions for using the ring profiles 226a, 226b. For example, the rules 234 may specify a range of time where one of more of the ringing profiles 226a, 226b applies. A user 220 may have a different ringing scheme for various times throughout the day. For example, a user may have preferences 226a which apply during working hours and different preferences 228b which apply during non-working hours.

In other embodiments, the user's rules 234 may define a process for selecting the appropriate ring profile 226a, 226b based on the identity of the calling party. For example, the user 220 may have a first ring profile 226a for calls originating from devices within the enterprise network 20 and a second profile 226b for calls from devices outside the enterprise network 20. In some embodiments, Automatic Number Identification (ANI) information from the call may be used to determine the identity of the caller.

In other embodiments, the user's rules 234 may define a process for selecting the appropriate ring profile 226a, 226b based on Dialed Number Identification Service (DNIS) information for the call. That is, an appropriate ring profile 226a, 226b may be selected based on the number that the calling party called.

The user's rules 234 are part of the user's preferences 231 and may be obtained, in the manner specified above, from group rules 213 in the group preferences 206.

Referring still to FIGS. 7 and 6b, at step 508, after user specific preferences 231 are determined, the user preferences 231 are stored to the user's profile 214 in the memory 210.

After user preferences 231, such as a ring profile 226 for the user 220 have been established, which define a ringing scheme for that user, calls to that user may be routed to any one of the user's devices based on the rules 234 and/or ring profile(s) 226 in the user's preferences 231. That is, devices may be rung in increasing order of priority until the user answers the call on a device associated with the user 220 or until the calling party terminates the call. Accordingly, by prioritizing devices in this way, a sequential ring system may be established.

In some embodiments, multiple devices may be assigned the same priority 232. In such embodiments, devices with the same priority 232 may be rung at the same time, thereby implementing a simultaneous ring system. Accordingly, by prioritizing devices in the manner described herein, a hybrid simultaneous and sequential ring system may be implemented. That is, devices may be rung in order of increasing priority and, where a plurality of devices share the same priority 232, they may be rung simultaneously.

Figure 8:
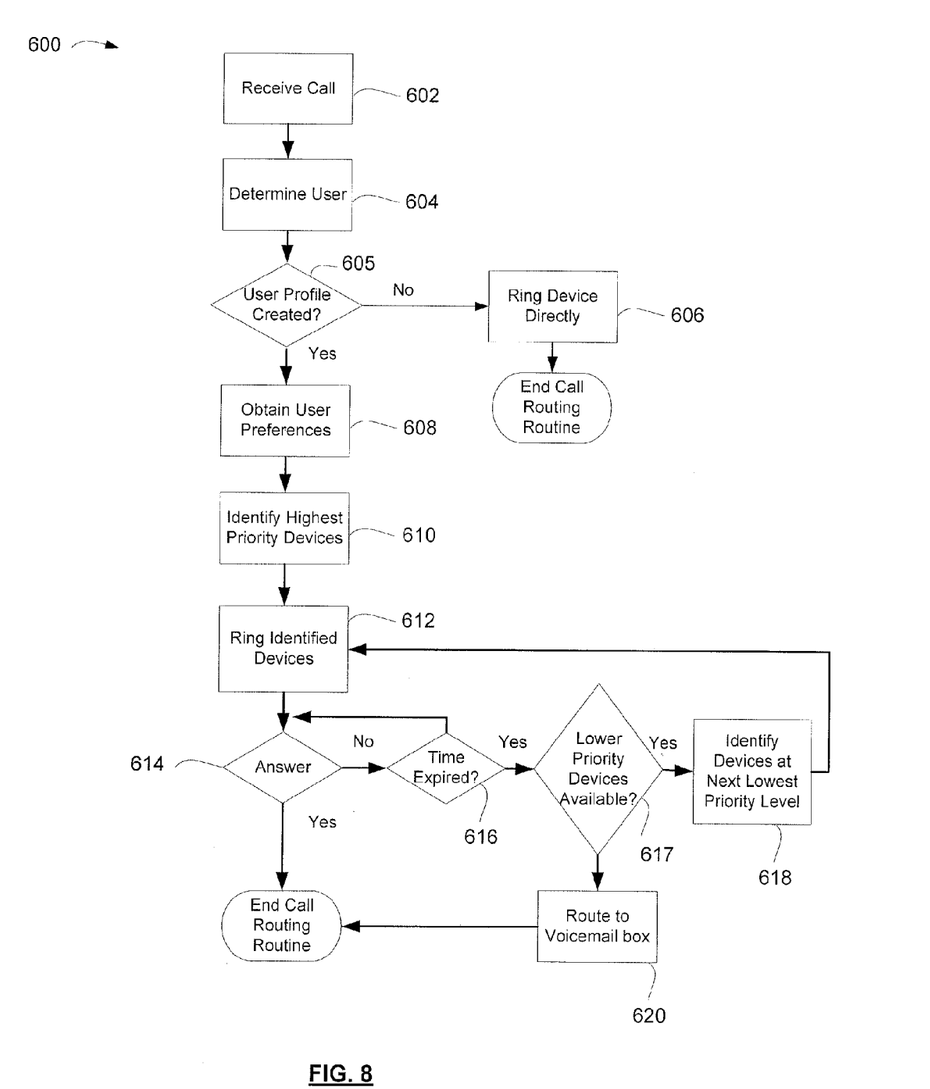
FIG. 8 shows a flowchart of a method of implementing calling preferences in accordance with an embodiment of the present disclosure.

Referring now to FIG. 8, together with FIGS. 1 and 6b, an example method 600 of routing calls according to the user preferences 231 is illustrated. The method may be performed by the incoming call management module 201 of the SMP 18.

At step 602, a call is received from a calling party. The received call is directed to a device or number associated with the enterprise network 20; thus, the enterprise network 20 is engaged in managing and/or directing the call. At step 604, when the call is received, the call management module 201 attempts to determine the user 220 which the calling party is trying to reach. This may be done, for example, by examining dialed number identification service (DNIS) information. DNIS information identifies what phone number the caller dialed. Other methods of determining which user the call is directed to are also possible. For example, in some embodiments, the determination may be based on an extension number.

Next, at step 605, the call management module 201 determines whether there is a profile 214 for the user 220 which the calling party is trying to reach. If the user 220 does not have a profile 214 or if the user's profile does not establish user preferences 231, the call management module 201 rings the device associated with the number which the calling party has called (step 606). This number may be, for example, a DNIS number or an extension number associated with a specific device.

If the user 220 who is the desired recipient of the received call has a profile 214 establishing user preferences 231, at step 608, the user preferences 231 are obtained for that user 220. The user preferences 231 may define at least one ring profile 226 for the user 220 and may define rules 234 for ringing the user 220.

The call management module 201 then rings the devices 224 in order of their priority 232, as specified in the user preferences 231. In some embodiments, this may include a step 610 in which the call management module 201 identifies all devices at the highest available priority level 232 and a step 612 in which the call management module 201 rings all of the identified devices. "Ringing devices" describes the process where a call or alert is sent to a device to indicate that the device has an incoming call. It will be appreciated that "ringing" a device does not, necessarily, require that an audible alarm will be heard from that device. Typically, a user 220 of a device may set the type of alarm, if any, which will be heard when the device is rung. Audible alarms may not be heard, for example, where a user has turned the device off or put it in a "quiet mode" where a vibratory alarm may indicate a ring. Typically, when a device is rung, the calling party hears an audible ring.

If the recipient user 220 answers the call (step 614), the process ends. Otherwise, the ringing may continue for a predetermined period of time (step 616). The predetermined period of time may be specified in the user's preferences 231. When the predetermined period of time expires, the device(s) with a next lowest priority level 232 are identified (step 618), if there are any such devices in the user's profile (step 617). Each of the identified devices may then be rung (step 612). This process may be repeated until the user 220 answers the call on a device (step 614) or, in some embodiments, until there are no lower priority devices listed in the user's preferences 231 (step 617). When the user preferences 231 contain no other lower priority devices, the call may be routed to a voicemail box associated with the user 220 (step 620). In other embodiments (not shown), the lowest priority devices may be rung indefinitely; that is, until the caller hangs up or the receiving device of the called party disconnects the call.

Figure 9:
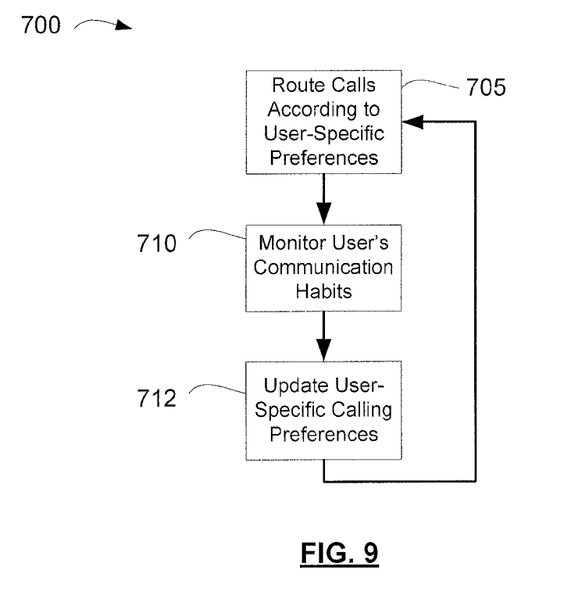
FIG. 9 shows a flowchart illustrating a method for adjusting user preferences in accordance with an embodiment of the present disclosure.

Referring now to FIG. 9, in some embodiments, the user profile configuration module 202 may further configure the user preferences 231 based on the user's communication habits. This method 700 may be implemented after default group preferences are established. For example, this method 700 may be utilized after calling preferences 231 are initialized based on group preferences 206 according to the methods discussed previously herein.

In the method 700 of FIG. 9, at step 705, calls are routed according to user-specific preferences 231 defined in the user's profile 214, 216. This may be done, for example, using the method 600 discussed above with respect to FIG. 8.

In the method 700 of FIG. 9, at step 710, data regarding the user's communication habits is collected and analyzed. The user profile configuration module 202 may monitor the user's usage data for the devices associated with the user in order to predictively determine the best ringing scheme for the user. To this end, the user profile configuration module 202 may consider a variety of statistics, such as, for example, the frequency with which a user answers received calls on each device, the frequency with which a user makes calls from various devices, presence data relating to the availability of each device, the most recently used device(s), time based patterns, such as usage trends for each device on specific days of the week or usage trends for each device at various times throughout the day, etc. The user profile configuration module 202 may use any combination of these statistics to predict a ringing scheme which is best suited for the specific user.

Next, at step 712, the user profile configuration module 202 may update the user's calling preferences 231 based on the usage data.

This process 700 may be repeated to continually update the user preferences associated with the user.

The example embodiments discussed above described an embodiment where the user profile configuration module 202 and the memory 210 are implemented in the SMP 18. However, in some embodiments, the user configuration module 202 may be implemented, in whole or in part, in other locations and on other systems. For example, user profiles may be configured on a separate device and stored to memory which is accessible by the SMP 18. Furthermore, the memory 210 may be external to the SMP 18.

It will also be appreciated that, in some embodiments, the user profile configuration module 202 may permit users to override any preferences 231 established by the system. That is, a user may be permitted to establish their own ringing scheme for ringing their associated devices.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions recorded thereon for performing the methods described herein.

Certain adaptations and modifications of the described embodiments can be made. Therefore, the above discussed embodiments are considered to be illustrative and not restrictive.

What is claimed is:

1. A method of establishing calling preferences for a user profile, the user profile including an association between a user identification, one or more user groups and two or more communication devices, each communication device having an associated device type, the method comprising:
   using group calling preferences associated with the one or more user groups to determine user calling preferences of the user profile by:
      determining group-specific relative ringing priorities for different device types in accordance with the group calling preferences, the group-specific relative ringing priorities defining an order in which to ring the different device types when a member of the user group is a recipient of a call;
      assigning user-specific relative ringing priority to each of the two or more communication devices based on the device type of each of the two or more communication devices, in accordance with the determined group-specific relative ringing priorities for different device types, the user-specific relative ringing priority defining an order in which to ring the two or more communication devices when the user identification associated with the user profile is a recipient of a call; and
   storing the user calling preferences in the user profile to a memory.

2. The method of claim 1, wherein the group calling preferences establish a ringing scheme for a plurality of device types.

3. The method of claim 1, wherein each of the device types include any one or more of the following device types: a cellular phone, a smartphone, a business phone, or a home phone.

4. The method of claim 1, wherein the one or more groups associated with the user identification describe at least one user characteristic.

5. The method of claim 4, wherein the at least one user characteristic includes an occupation.

6. The method of claim 1, further comprising monitoring user communication habits and updating the user calling preferences associated with the user identification based on the user communication habits.

7. The method of claim 1, further comprising: establishing a ringing scheme for the two or more communication devices based on the assigned user-specific relative ringing priority of each of the two or more communication devices.

8. An electronic device, comprising:
   a memory including a user profile, the user profile including an association between a user identification, one or more user groups and two or more communication devices, each communication device having an associated device type;
   a controller configured to:
      use group calling preferences associated with the one or more user groups to determine user calling preferences of the user profile by:
         determining group-specific relative ringing priorities for different device types in accordance with the group calling preferences, the group-specific relative ringing priorities defining an order in which to ring the different device types when a member of the user group is a recipient of a call; and
         assigning user-specific relative ringing priority to each of the two or more communication devices based on the device type of each of the two or more communication devices, in accordance with the determined group-specific relative ringing priorities for different device types, the user-specific relative ringing priority defining an order in which to ring the two or more communication devices when the user identification associated with the user profile is a recipient of a call; and store the user calling preferences in the user profile.

9. The electronic device of claim 8, wherein the group calling preferences establish a ringing scheme for a plurality of device types.

10. The electronic device of claim 8, wherein the one or more groups associated with the user identification describe user characteristics.

11. The electronic device of claim 8, wherein the controller is further configured to monitor user communication habits and update the user calling preferences associated with the user identification based on the user communication habits.

12. The electronic device of claim 8, further comprising a call management module, the call management module being configured to:

receive a call;

determine the user identification associated with the call; and ring one or more of the communication devices in an order based on the assigned user-specific relative ringing priority specified by the user calling preferences in the user profile associated with the user identification stored in the memory.

13. The electronic device of claim 8, wherein the controller is further configured to: establish a ringing scheme for the two or more communication devices based on the assigned user-specific relative ringing priority of each of the two or more communication devices.

14. A method of ringing one or more communication devices, the method comprising:

receiving a call;

determining a user identification associated with a recipient of the call;

determining, from a user profile associated with the user identification, user calling preferences associated with the user identification and two or more communication devices associated with the user identification, each communication device having an associated device type;

determining user-specific relative ringing priority assigned to each of the two or more communication devices, the user-specific relative ringing priority defining an order in which to ring the two or more communication devices when the user identification associated with the user profile is a recipient of a call, the user-specific relative ringing priorities being assigned in accordance with group-specific relative ringing priorities for different device types defined in group call preferences associated with one or more user groups associated with the user identification, the group-specific relative ringing priorities defining an order in which to ring the different device types when a member of the user group is a recipient of a call; and ringing one or more of the two or more communication devices in an order based on the user-specific relative ringing priority.

15. The method of claim 14, wherein the one or more groups associated with the user identification describe at least one user characteristic.

16. The method of claim 14, further comprising monitoring user communication habits and updating the user calling preferences associated with the user identification based on the user communication habits.

17. The method of claim 14, wherein the user-specific relative ringing priority assigned to each of the two or more communication devices establish a ringing scheme for the two or more communication devices.

\* \* \* \* \*